United States Patent

Farley et al.

[11] Patent Number: 6,076,767
[45] Date of Patent: Jun. 20, 2000

[54] FLIGHT CONTROL SURFACE ACTUATION SYSTEM

[75] Inventors: Brian Farley, Hartpury; Antony Morgan, Wolverhampton; Arthur Derek Mountney, Telford; Timothy Robert Matthews, Penkridge, all of United Kingdom

[73] Assignee: Dowty Boulton Paul Limited, Wolverhampton, United Kingdom

[21] Appl. No.: 08/931,670

[22] Filed: Sep. 17, 1997

[30] Foreign Application Priority Data

Sep. 18, 1996 [GB] United Kingdom .................. 9619488

[51] Int. Cl.[7] .................................................. B64C 13/36
[52] U.S. Cl. ........................ 244/78; 244/76 C; 244/224; 244/226; 244/212
[58] Field of Search .................................... 244/78, 76 C, 244/224, 226, 227, 231, 212, 215

[56] References Cited

U.S. PATENT DOCUMENTS

| | | | |
|---|---|---|---|
| 2,343,912 | 3/1944 | Lauck | 244/226 |
| 2,376,320 | 5/1945 | Butrovich et al. | 244/226 |
| 2,386,219 | 10/1945 | Lauck | 244/226 |
| 2,657,539 | 11/1953 | Geyer | 244/226 |
| 3,411,410 | 11/1968 | Wetsbury et al. | 244/78 |
| 4,079,906 | 3/1978 | Durandeau et al. | 244/78 |
| 5,628,477 | 5/1997 | Caferro et al. | 244/224 |
| 5,680,124 | 10/1997 | Bedell et al. | 244/215 |
| 5,873,548 | 2/1999 | Huling | 244/78 |

*Primary Examiner*—J. Woodrow Eldred
*Attorney, Agent, or Firm*—Marshall, O'Toole, Gerstein, Murray & Borun

[57] ABSTRACT

A flight control surface actuation system is provided in which a plurality of actuators (6–13) are connected to one another in order to synchronize their operation. Each actuator has its own gearbox such that the torque transmitted in the synchronizing element is kept low.

14 Claims, 8 Drawing Sheets

FLIGHT CONTROL SURFACE ACTUATION SYSTEM

TECHNICAL FIELD

The present invention relates to a flight control surface actuation system. Such an actuation system is used to deploy and retract aircraft flight control surfaces, typically trailing edge flaps and leading edge high lift devices.

The flight control surfaces are moved between the high lift and normal states by actuators. It is desirable that the deployment of the flight control surfaces occurs at a steady rate, and that deployment of the surfaces along one side of the aircraft occurs in synchronisation with deployment of the surfaces along the other side of the aircraft. Any asymmetry can give rise to severe difficulties controlling the aircraft.

DISCLOSURE OF THE INVENTION

According to the present invention, there is provided a flight control surface actuation system comprising at least three linear hydraulic actuators which control the position of aircraft flight control surfaces, characterised in that each actuator is mechanically synchronised with the other actuators via a synchronising element such that motion of a first actuator in advance of that of a neighbouring second actuator causes the leading actuator to be braked thereby allowing the second actuator to catch up.

It is thus possible to synchronise the flight control surfaces of an aircraft using a mechanical interconnection, whilst retaining the use of a linear hydraulic actuation system. This is particularly beneficial as such a system provides cost and weight advantages when compared with prior art synchronised actuation systems, without any compromise to airworthiness requirements for asymmetry protection.

Preferably, the synchronising element is a cable.

Advantageously, the cable is flexible and can be routed along non-linear paths, which obviates the need to introduce universal joints and steady bearings.

Preferably, the synchronising cable is located internally to a hydraulic fluid supply line for the actuators. This simplifies the routing of the synchronising element and also protects the cable from possible damage. Furthermore, it removes the necessity to use rotary shaft seals in such a high pressure system.

Preferably, the synchronising element is coupled to each actuator in series. This simplifies installation. The synchronising elements along either wing are connected together via a coupling located central to the actuation system. The coupling also serves as a junction to supply oil to the hydraulic extend line. In an alternative arrangement, individual down drive cables may be used to interconnect each actuator from a common synchronising element.

To account for airframe tolerances the synchronising element coupling may also comprise a backlash device, to provide a degree of lost motion between left and right hand wing actuators.

Preferably, each actuator includes an integral synchronisation mechanism. The synchronisation mechanism may comprise a nut retained by a piston of the actuator. The nut also threadedly engages a lead screw. The lead screw is coupled to a suitable gear arrangement such as a worm and wheel, situated in the gear head of the actuator. The worm gear is of a double enveloping arrangement, such that its output is connected to the neighbouring actuators using a flexible cable. During extension and or retraction of the actuators, the nut translates with the piston as it moves under the action of hydraulic pressure. The linear movement of the nut thus causes the lead screw to rotate, thus transferring rotary movement to the flexible cable, via the wheel and worm.

Advantageously, the use of a worm and wheel gear allows a high gear ratio to be selected. This, along with the characteristic of a low transfer efficiency, ensures torques induced into the synchronisation element are comparatively low. The inefficiency of the worm and wheel ensures that the torque developed in the synchronisation element is sufficient to resist differential movement between the actuators and provides good synchronising accuracy.

It is thus possible to use relatively light (ie. not substantial) synchronising element, as the torques acting thereon are relatively small. This avoids the weight implications of prior art synchronised actuation systems, which employ relatively large synchronising shafts to transfer torque between control surface actuators.

Advantageously, the actuators are connected sequentially along the synchronising element. Differential movement between actuators is inhibited, thus providing a means of mechanical synchronisation.

As a consequence of one actuator travelling in advance of the remaining actuators, a torque is induced into the flexible cable. The torque resists further rotation of the worm/wheel of the leading actuator thus preventing further linear movement until the lagging actuators maintain the same position. At this point the torque exerted on the leading actuator is removed and the actuators are free to move in unison. Hence, even under asymmetric wing loading the actuators will still extend and retract at the same rate and to the same position, within limits.

Preferably, the synchronising element terminates at a braking device on either wing. Thus, in the event of failure of the synchronising element, the braking devices can be operated in order to lock the flight control surfaces in a fixed position. This action limits the degree of asymmetry which may occur. Hydraulic locking of the actuators may also be provided.

Preferably, at least one position transducer is used to monitor the position of the control surfaces, with respect to the commanded position. Also, comparison between left and right hand wings can be undertaken to detect for an asymmetry condition, thus necessitating the application of the braking devices.

A control manifold may be arranged to allow the actuation system to be driven to a series of discrete positions, or it may be configured to allow the position of the control surfaces to be continually variable.

The control manifold may also be configured with a secondary power supply, comprising an electric motor, hydraulic pump and fluid reservoir. The secondary power supply system is completely segregated from the main hydraulic power supply.

Advantageously, the secondary power supply system ensures that the actuation system achieves recognised reliability targets for transport availability.

DESCRIPTION OF THE FIGURES

The present invention will further be described by way of example, with reference to the accompanying drawings, in which.

DESCRIPTION OF PREFERRED EMBODIMENTS

Figure 1:
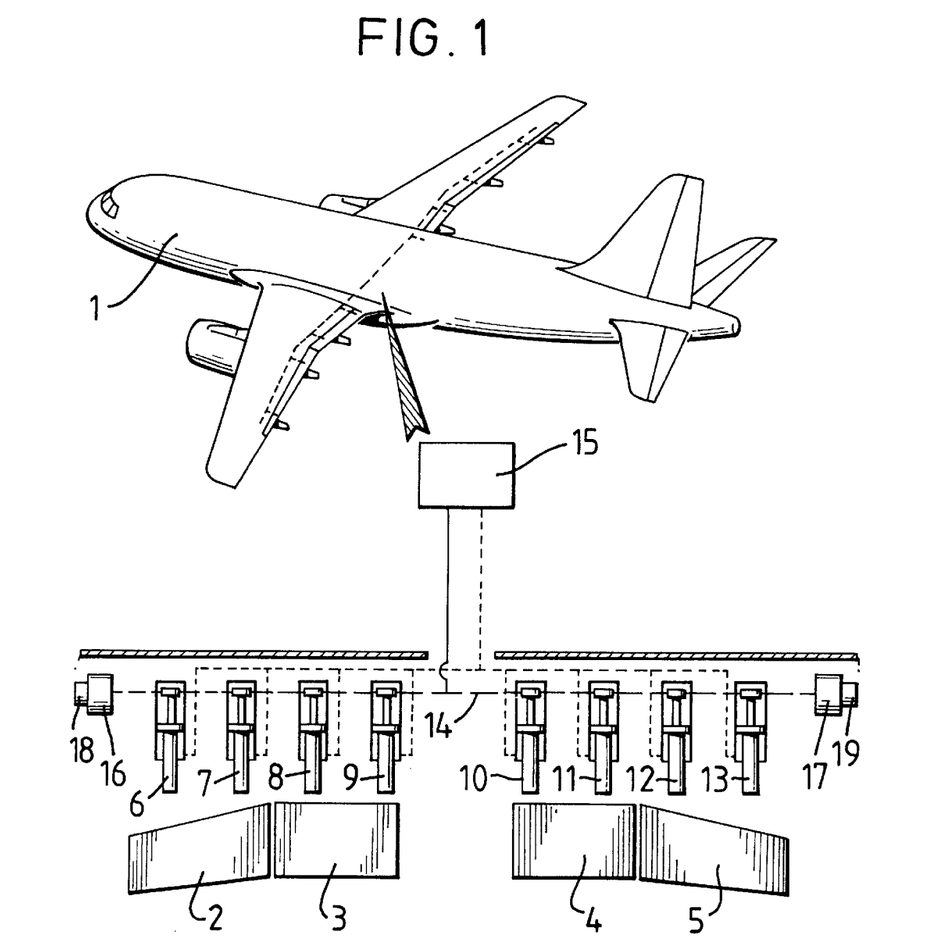
FIG. 1 is a schematic view of an aircraft incorporating an actuation system constituting an embodiment of the present invention.

FIG. 1 shows a schematic representation of a trailing edge flap actuation system and its location with respect to the aircraft 1. The embodiment could also equally be applied to leading edge devices.

As illustrated, the aircraft has four trailing edge control surfaces 2,3,4 and 5. Each flight control surface has two associated actuators, elements 6 through to 13. All the actuators are interconnected by a synchronising cable 14. A control manifold 15 directs hydraulic fluid to the actuators to cause them to either deploy or retract the control surfaces. Position transducers 18 and 19 are located at either wing tip end of the synchronising cable to measure the position of the control surfaces. Outputs of the transducers 18 and 19 are provided to a data processor which compares the achieved position with that selected and also monitors for asymmetries between the two wings. In the event of an asymmetric condition occurring, braking devices 16 and 17 positioned in each wing are invoked to retain the flight control surfaces in a fixed position. The braking devices 16 and 17 may either be electrically or hydraulically operated.

Figure 2:
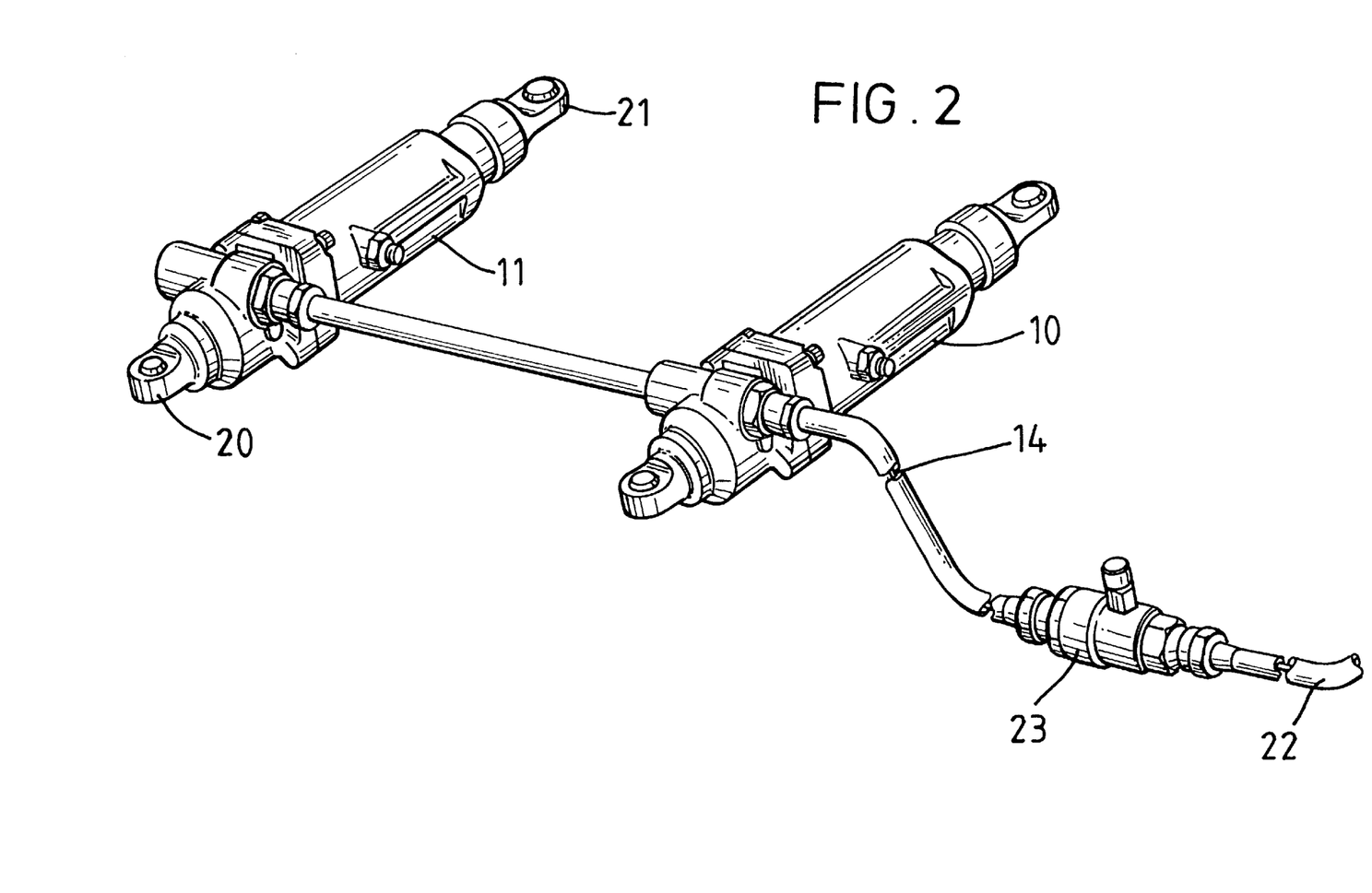
FIG. 2 is a perspective schematic diagram illustrating part of the actuation system.

Two of the actuators 10 and 11 are shown in greater detail in FIG. 2. The actuator 11 has an attachment point 20 which is connected to the airframe (not shown). The actuator is also attached to a linkage arrangement (not shown), connected to the flight control surface (not shown), via an eye-end attachment 21. The actuators 10 and 11 are connected together by the synchronising cable 14 which runs within a hydraulic fluid supply line 22 which provides working fluid to extend the actuators. A hydraulic connection from the manifold 15 to the actuators is made via a coupling 23.

Figure 3A:
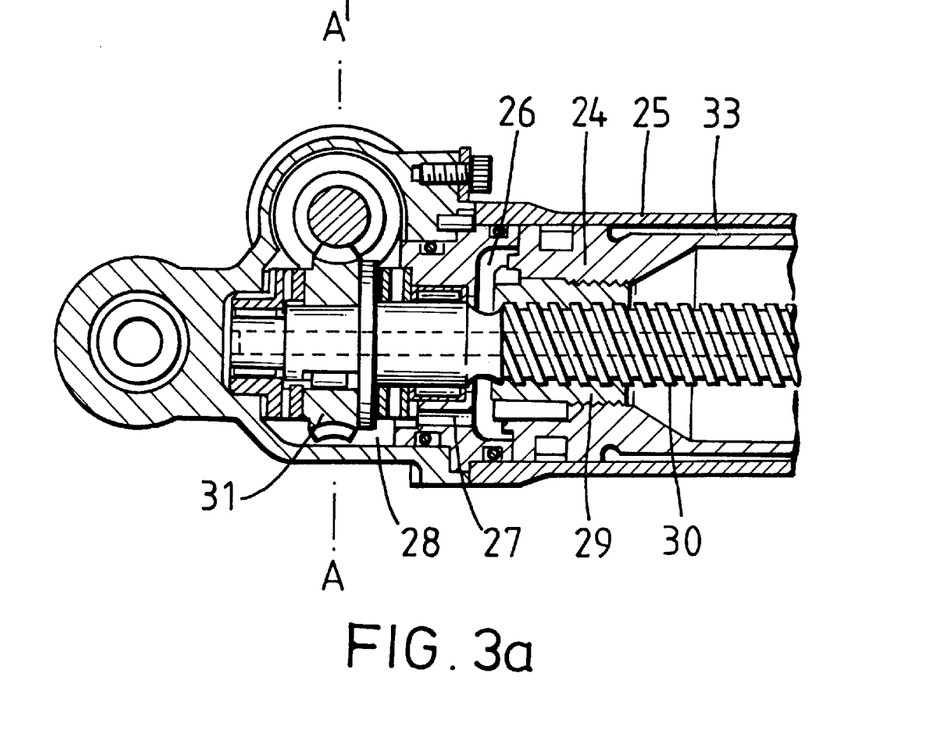
FIGS. 3a and 3b are sections through an actuator used in the arrangement shown in FIG. 1
Figure 3B:
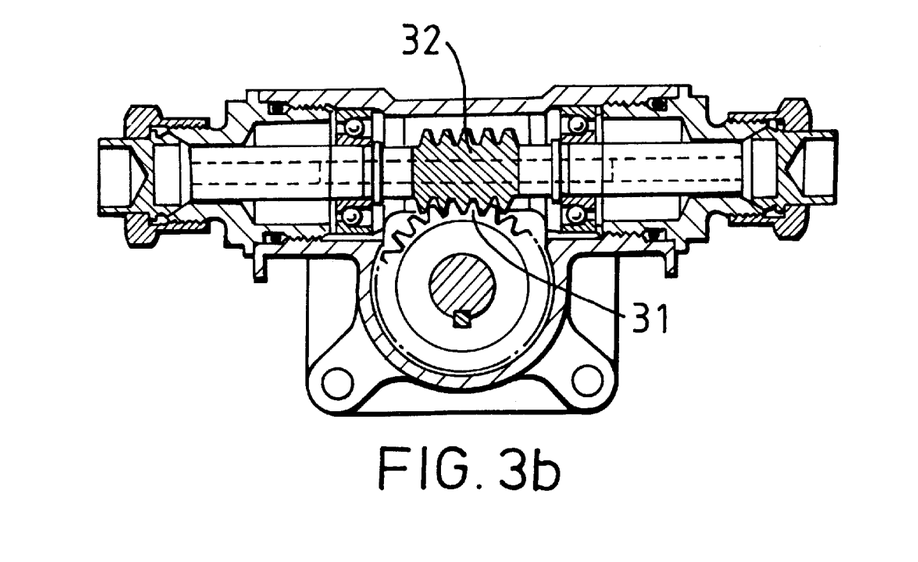
Figure 3C:
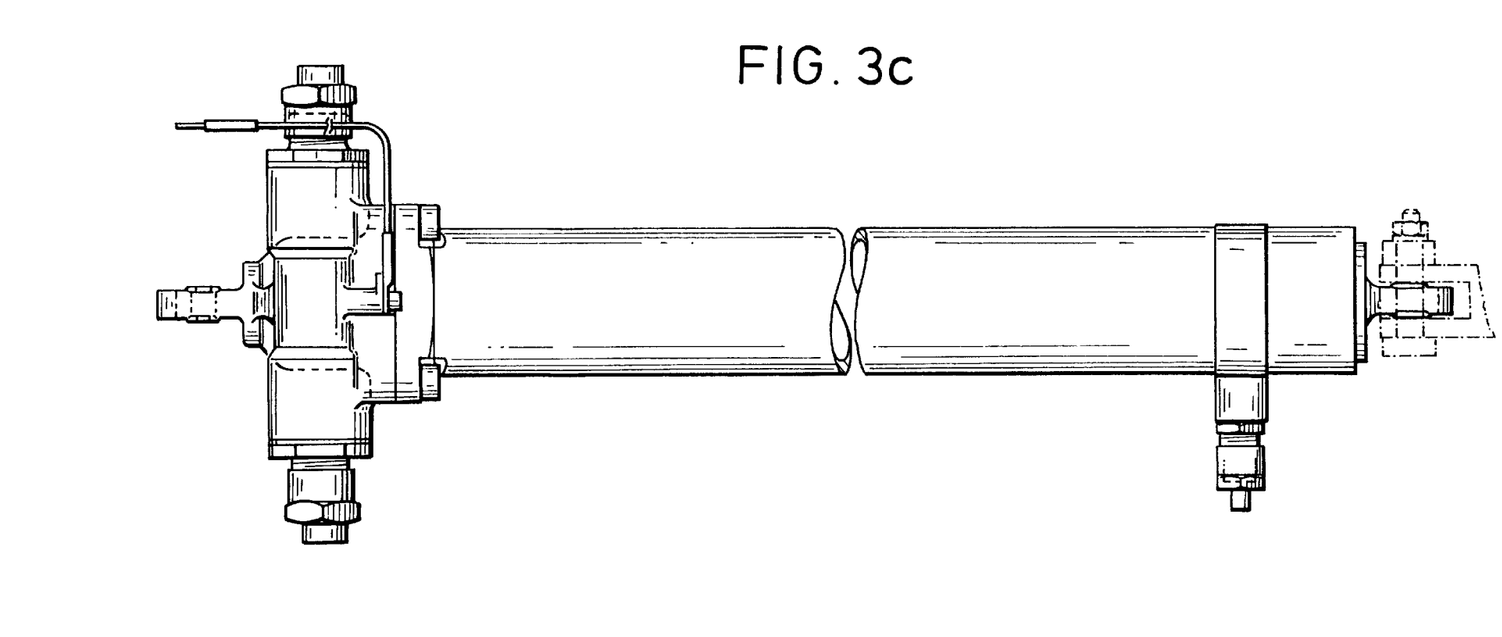
FIG. 3c is a plan view of the actuator.

A part section through a single actuator is illustrated in FIGS. 3a and 3b.

The actuator comprises a piston 24 which translates within a cylinder and is in substantially fluid sealed engagement therewith. The piston is connected to eye-end attachment 21. Hydraulic fluid can be introduced into a first chamber 26 via drillings 27 connecting the chamber 26 to a further chamber 28 which is in fluid flow communication with the hydraulic supply line 22. Introduction of fluid into the chamber 26 causes the piston 24 to extend from the cylinder 25. Motion of the piston causes a nut 29 which is affixed thereto to move longitudinally with respect to a lead screw 30 thereby causing the lead screw 30 to rotate as the actuator is operated. Rotation of the lead screw 30 is transmitted via wheel and worm 31 and 32 respectively, to the synchronising cable 14 in order to transfer rotary motion to the cable.

Hydraulic fluid may also be introduced into a second chamber 33 from a further hydraulic line in order to retract the actuator. When one chamber is connected to a source of hydraulic pressure, the other chamber is connected to a return line, thereby ensuring that the actuator does not become hydraulically locked.

Alternatively, the actuators may be of the regenerative type, where during normal deployment, both chambers 26 and 33 are pressurised, but the unequal surface area across the piston 24 causes the actuator to move to the deployed position. Motion to the undeployed position is achieved by aerodynamic forces acting on the associated control surface.

Figure 4:
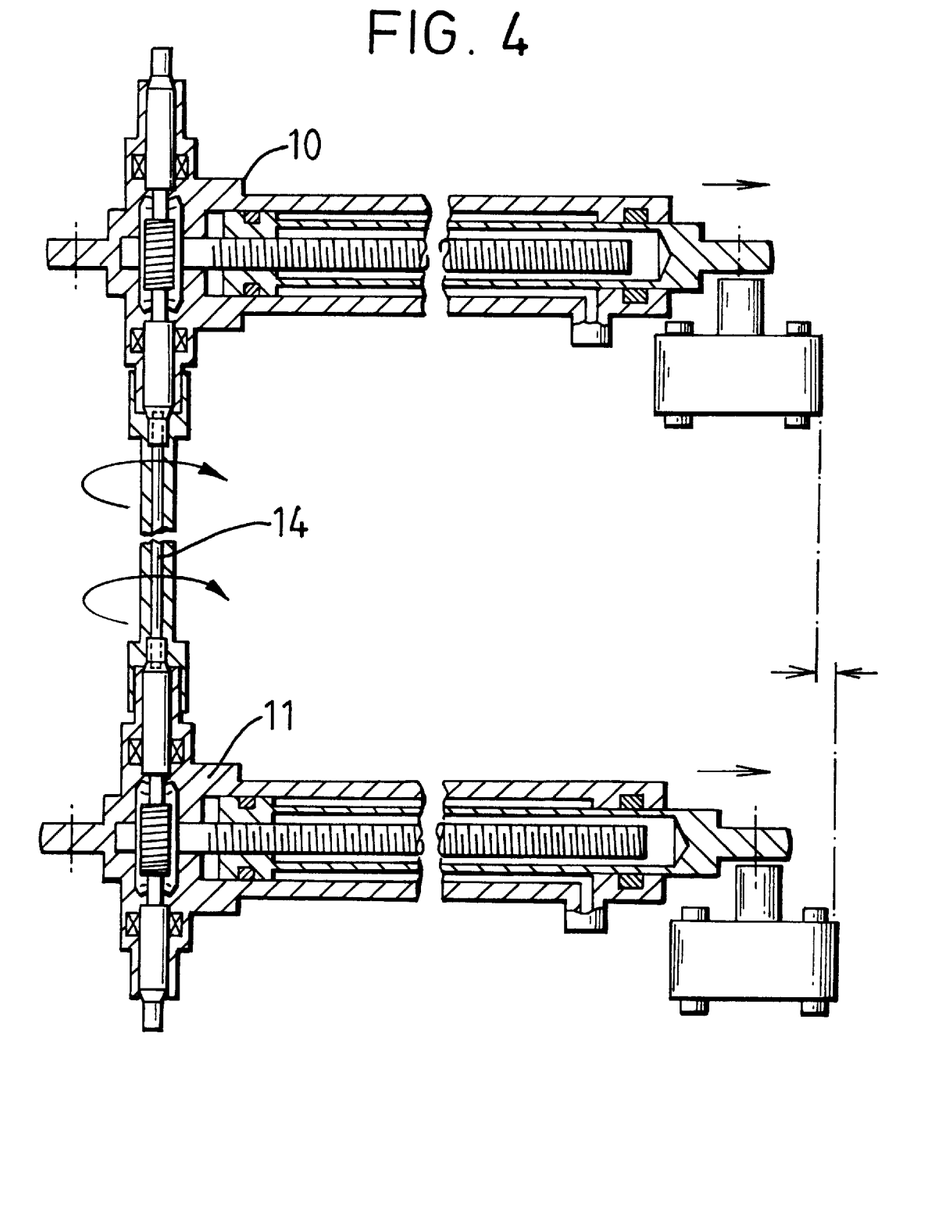
FIG. 4 is a schematic diagram of two synchronising elements.

FIG. 4 presents a schematic representation of the synchronising elements. It will be noted that the transfer efficiency between the actuator and synchronising cable is quite low. More specifically, the output shaft undergoes many turns during the stroke of the actuator, and consequently only a relatively low braking torque need be applied at the synchronising cable, in order to prevent deployment of the actuator. Furthermore, it is not possible to drive the actuator merely by applying a torque at the synchronising cable. Thus, when the actuators 10 and 11 are connected in series, if during deployment one actuator tries to move in advance of its neighbour, the synchronising cable 14 will become wound up and will exert a restoring torque on the leading actuator 11 thereby braking its motion and enabling the lagging actuator 10 to catch up. Once the actuators become synchronised, the synchronising cable is returned to a low torque state and the leading actuator 11 can continue to move again.

Figure 5:
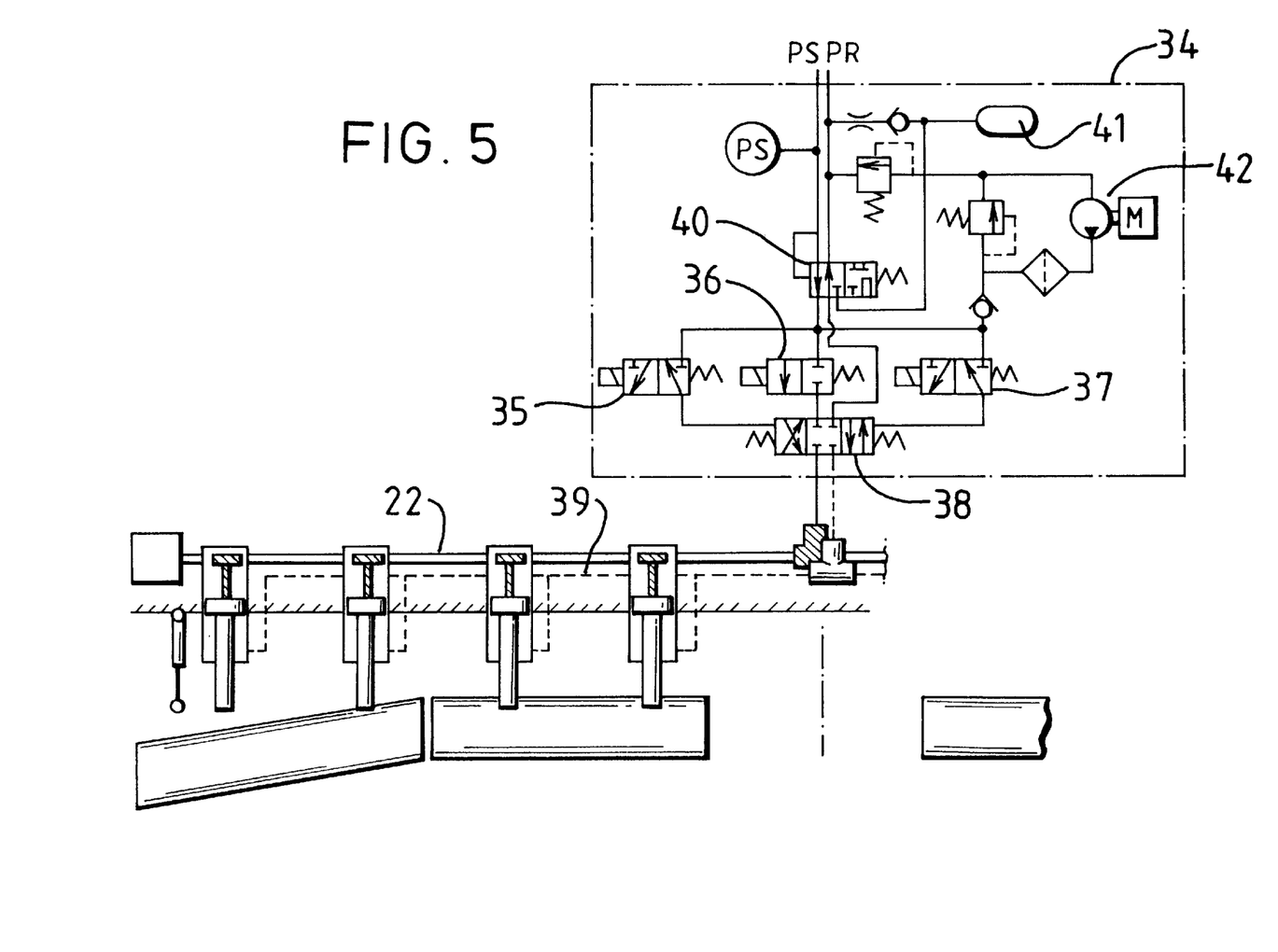
FIG. 5 illustrates the circuit design of the control manifold.

FIG. 5 provides a circuit diagram of the control manifold 34 including the secondary power supply system. In this example, the control manifold is configured to position the control surfaces at discrete positions using a series of solenoid operated valves 35,36,37 and the extend/retract/lock control valve 38. Hydraulic fluid is directed to the control valve 38 via operation of an enable/disable valve 36 from the aircraft hydraulic supply line (Ps). Extension or retraction of the actuators is determined by operation of either pilot solenoid valve 35 or 37, which directs hydraulic fluid to move the control valve 38 in the appropriate direction, to connect either the hydraulic supply to the actuators extend 22, or retract lines 39.

If a failure in the aircraft hydraulic supply line occurs, the actuation system may still be operated from the secondary power supply. A switch-over valve 40 detects loss of fluid from the aircraft hydraulic supply and switches hydraulic connection to the secondary system. Hydraulic fluid is then drawn from an accumulator 41 via an electric motor/pump arrangement 42 to provide hydraulic power to the system.

In an alternative arrangement, the control manifold may be configured to allow the position of the flight control surfaces to be continuously variable in an active manner. In this instance, the solenoid operated valves would be dispensed with and replaced with either an electro-hydraulic servo valve, or direct drive valve arrangement.

The secondary power supply is considered an optional feature of the design, its necessity dictated by the reliability requirement for the complete actuation system.

Figure 6:
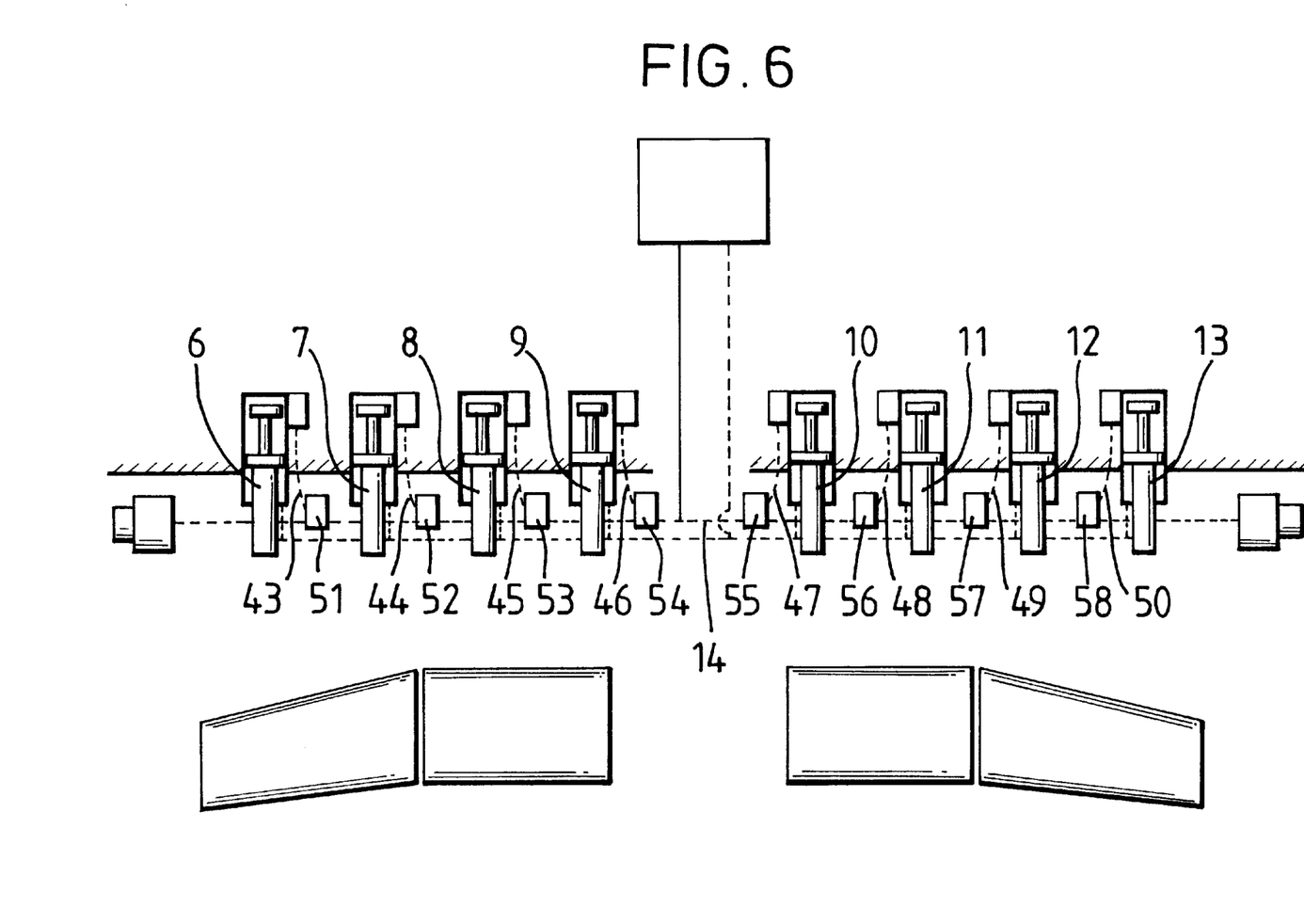
FIG. 6 shows an alternative arrangement, using down drive cables.

FIG. 6 shows an alternative arrangement for the actuation system, whereby each of the actuators 6 through to 13 are interconnected using a down drive shaft/cable 43 through to 50, and a down drive gearbox 51 through to 58 connected to the synchronising cable 14. This arrangement is of benefit where the aircraft wing structure does not permit the routing of the synchronising cable directly between the head ends of the actuators. This simplifies retrofitting of the system to existing aircraft.

Figure 7:
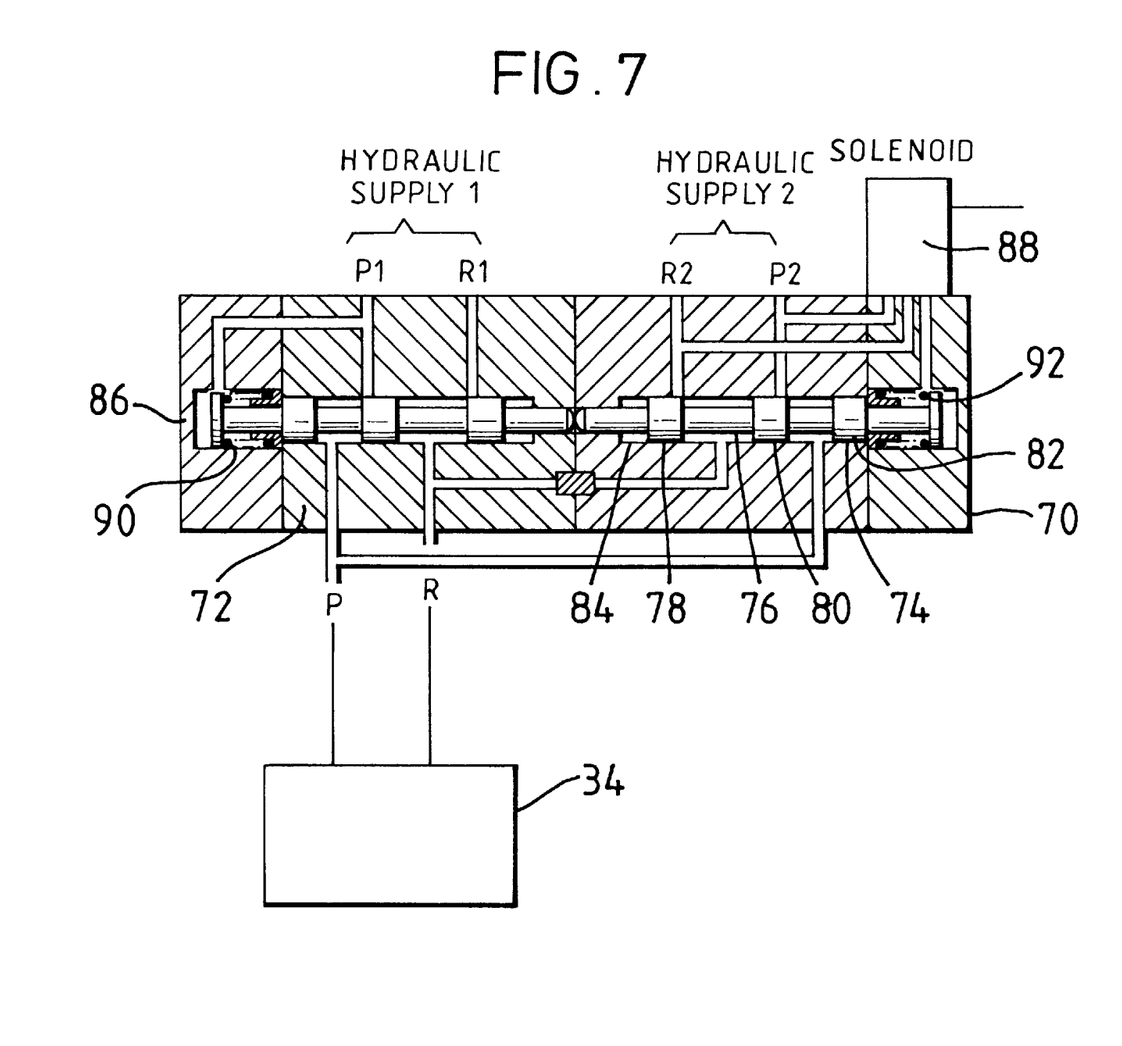
FIG. 7 shows a modification to the hydraulic circuit.

FIG. 7 shows a modification of the hydraulic arrangement shown in FIG. 5. A changeover valve 70 is provided intermediate first and second hydraulic supplies and the control manifold 34. The changeover valve is a semi-automatic valve allowing protection from a single fault which might otherwise result in loss of both hydraulic supplies.

The changeover valve comprises first and second mechanically linked spool valves 72 and 74. The valves are substantially identical and are arranged in opposition. In each valve, a valve member 76 carries three enlarged portions 78, 80 and 82 which are in sliding substantially fluid sealed contact with a cylinder 84 formed within the valve housing.

The first and second valves have connections P1, R1 and P2, R2 respectively to the individual hydraulic supplies and have outputs forming a common connection to the control manifold 34. In the position shown in FIG. 7, both the hydraulic supplies are isolated from the control manifold 34. Each of the first and second spool valves is provided with a piston and cylinder arrangement 86. The piston and cylinder arrangement on the first valve 72 connected to the primary hydraulic supply is in permanent fluid flow communication with the primary hydraulic supply P1. The piston and cylinder arrangement of the second valve 74 connected to the secondary hydraulic supply is selectively collectable to the second hydraulic supply via a solenoid operated valve 88.

The changeover valve operates during every flight. When both hydraulic systems are shut down the valve is spring biaised to the centred null position shown in FIG. 7. When both hydraulic systems are powered up, the connection from the supply line P1 to the piston and cylinder arrangement 86 of the left hand side of the valve as shown in FIG. 7 biases the changeover valve spool to connect the primary hydraulics supply to the control manifold. This regular movement of the valve prevents silting of the valve and possible dormant failure of the changeover valve spool.

In the event that the primary hydraulic supply pressure is lost, the valve becomes centred to the null position by the internal springs 90 and 92. This disconnects the hydraulic supply to the control manifold 34, thereby avoiding the loss of both hydraulic supplies through a common fault.

A pressure switch (not shown) is provided as part of the control manifold for sensing the pressure of the hydraulic supply. Failure of the primary hydraulic supply is sensed by the pressure switch, which can then send a signal to the system control in order to cause the secondary hydraulic supply to be connected to the control manifold 34 by operation of the solenoid valve 88 when it is desired to operate the flaps. Thus the secondary hydraulic supply is only selected upon flap demand. Once the flaps have been moved to the required position, the solenoid valve 88 is de-energised thereby allowing the changeover valve to return to the position where both hydraulic supplies are isolated. This safeguards the backup hydraulic supply against being compromised due to exposure to a leak. The secondary hydraulic supply is only exposed to the possible leak for a brief duration of time when it is required to actuate the flight control surfaces.

As shown in FIG. 7, the central spool 76 may be divided as two abutting halfs. This allows the possibility of the spool portion associated with the second hydraulic supply to be moved in order to connect the second hydraulic supply to the control manifold 34 even in the event that the spool portion associated with the first hydraulic supply has become jammed in the changeover valve.

It is thus possible to provide a lightweight and reliable flight control surface actuation system.

We claim:

1. A flight control surface actuation system, comprising at least three linear hydraulic actuators which control the position of aircraft flight surfaces, and in which each actuator is mechanically synchronised with the other actuators via a synchronising element such that a motion of a first actuator in advance of that of a neighbouring second actuator causes the first actuator to be braked thereby allowing the second actuator to catch up while not driving the second actuator through the synchronizing element.

2. A flight control surface actuation system as claimed in claim 1, in which the synchronising element is a cable.

3. A flight control surface actuation system as claimed in claim 2, characterised in that the cable is located internally to a hydraulic fluid supply line for the actuators.

4. A flight control surface actuation system as claimed in claim 1, in which the synchronising element is coupled to each actuator in series.

5. A flight control surface actuation system as claimed in claim 1, in which the synchronising elements along opposed wings are connected together via a coupling located central to the actuation system.

6. A flight control surface actuation system as claimed in claim 5, in which a backlash device is also provided to provide a degree of lost motion between left and right hand wing actuators.

7. A flight control surface actuation system as claimed in claim 1, in which each actuator includes an internal synchronisation mechanism.

8. A flight control surface actuation system as claimed in claim 7, in which the internal synchronisation mechanism comprises a nut retained by a piston of the actuator, the nut threadedly engages a lead screw which is coupled to a gear arrangement which is connected to the synchronising element.

9. A flight control surface actuation system as claimed in claim 8, in which the gear arrangement comprises a worm gear and a wheel gear arranged such that the torque developed in the synchronising element is sufficient to resist differential movement between actuators.

10. A flight control surface actuation system as claimed in claim 1, further comprising a braking device in each wing for locking the actuators in the event of failure of the synchronising element.

11. A flight control surface actuation system as claimed in claim 1, further comprising at least one position transducer for monitoring the positions of the flight control surfaces with respect to the commanding positions.

12. A flight control surface actuation system as claimed in claim 1, further comprising a back-up supply of hydraulic fluid, and means for supplying that fluid under pressure to operate the actuators in the event of failure of a primary hydraulic supply.

13. A flight control surface actuation system as claimed in claim 1 and further comprising a first supply of hydraulic fluid under pressure, an second supply of hydraulic fluid under pressure and a changeover valve 70 arranged to connect the first supply of hydraulic fluid to the actuators when the pressure thereof exceeds a first value and to selectively connect the second supply to the actuators only when commanded.

14. A flight control surface actuation system as claimed in claim 1, in which each actuator is connected to the synchronising element via a respective down drive gearbox and down drive element.

* * * * *